United States Patent

[11] 3,608,585

| | | |
|---|---|---|
| [72] | Inventor | Andrew B. Huntington<br>Waterford, Mich. |
| [21] | Appl. No. | 875,994 |
| [22] | Filed | Nov. 12, 1969 |
| [45] | Patented | Sept. 28, 1971 |
| [73] | Assignee | Ross Operating Valve Company<br>Detroit, Mich. |

[54] SOLENOID VALVE
8 Claims, 5 Drawing Figs.

[52] U.S. Cl. .................................................... 137/625.65,
251/141, 335/262, 335/274
[51] Int. Cl. .................................................... F16k 11/02,
F16k 31/02, H01f 3/02
[50] Field of Search .......................................... 251/130,
129, 139, 140, 141; 335/261, 260, 262, 274;
137/625.65, 596.17

[56] References Cited
UNITED STATES PATENTS

| | | | |
|---|---|---|---|
| 1,892,917 | 1/1933 | Walker et al. ................. | 251/140 |
| 2,544,491 | 3/1951 | Davis............................. | 335/261 X |
| 2,610,233 | 9/1952 | Caldwell........................ | 335/261 |
| 2,797,061 | 6/1957 | Buchanan..................... | 251/130 |
| 3,157,831 | 11/1964 | Ray............................... | 251/141 X |
| 3,458,769 | 7/1969 | Stampfli........................ | 137/625.64 X |

*Primary Examiner*—Henry T. Klinksiek
*Attorney*—Harness, Dickey & Pierce

ABSTRACT: A three-way solenoid valve of the CT type in which the T-shaped armature is of laminated construction and carries inlet and exhaust valves at its opposite ends.

INVENTOR.
Andrew B. Huntington
BY
Harness, Dickey & Pierce
ATTORNEYS.

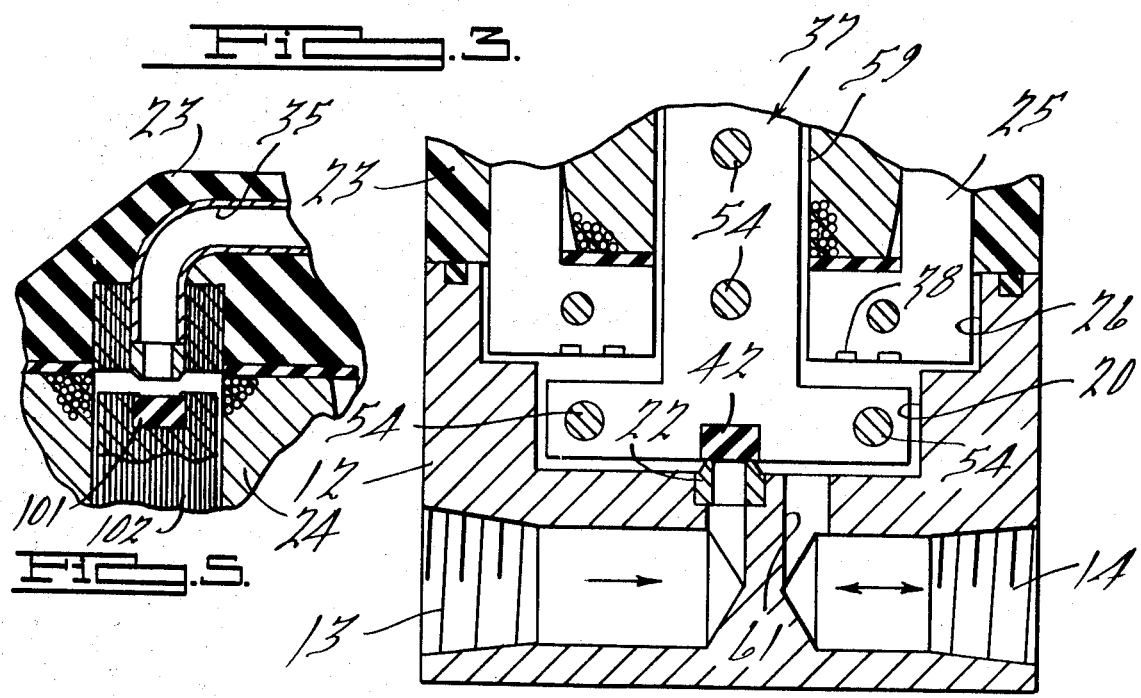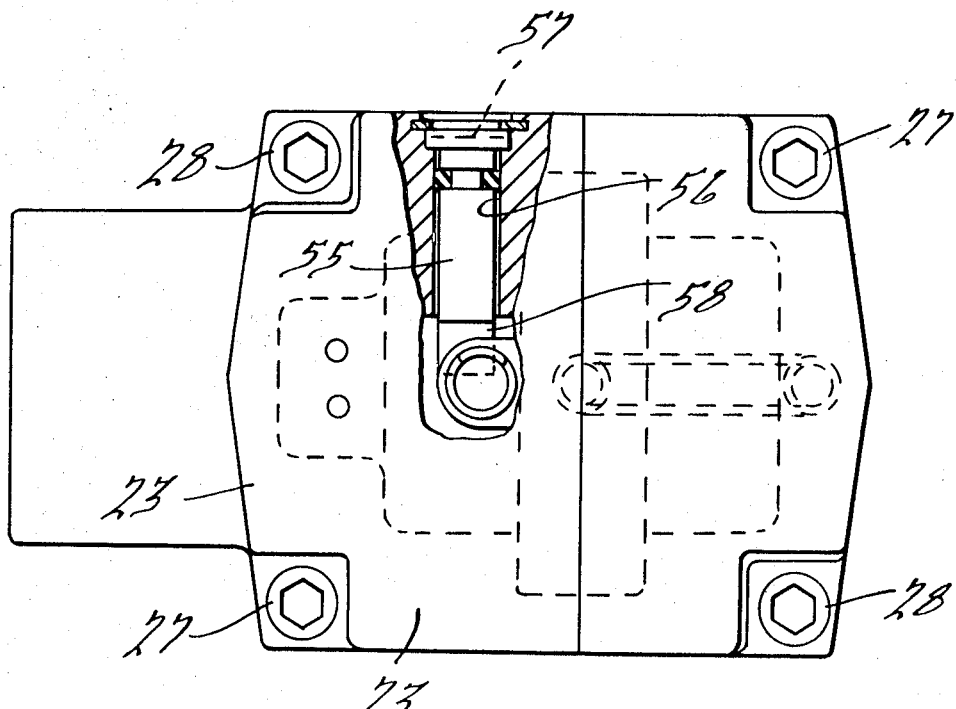

SOLENOID VALVE

BACKGROUND OF THE INVENTION

1. Field of the Invention

The invention relates to valves of the solenoid-actuated type.

2. Description of the Prior Art

The prior art is exemplified by U.S. Pat. No. 2,614,584 issued Oct. 21, 1952 to George A. Goepfrich and entitled "Solenoid Actuated Valve." In this patent, a spring-urged plunger is of cylindrical shape and carries the inlet valve at one end thereof. The electromagnetic force counteracts this spring.

If the valve is of the normally closed type, the spring must be strong enough to counteract the inlet pressure and the electromagnetic force must be sufficient to counteract this spring. Therefore, the inlet pressure which can be used is limited by the electromagnetic force which can be derived from the coil, since a higher pressure will necessitate a stronger spring and therefore more electromagnetic force. At a given inlet pressure, the size of the inlet valve orifice is similarly limited by the amount of electromagnetic force, since here again the total force which the spring must counteract to keep the valve closed is proportional to the area of the inlet valve opening.

If the valve is of the normally open type, the electromagnetic force must overcome not only the spring force but also the pressure at the inlet valve when the plunger has shifted to its closed position.

BRIEF DESCRIPTION OF THE INVENTION

According to the invention, a solenoid actuated valve is provided which will permit substantially higher inlet pressures, larger inlet openings, or both, for a given input wattage. This is accomplished by the specific construction of the device, which incorporates a T-shaped armature of laminated construction. This armature carries the inlet valve at one end thereof and the exhaust valve at the other end, the armature being spring-urged towards one position. Because of the high electrical efficiency of this construction, much greater force output is achieved per watt of input at any given stroke than is the case with the patented valve. In the case of a normally closed valve this permits the valve to incorporate stronger springs to counteract the higher inlet forces tending to open the valve.

BRIEF DESCRIPTION OF THE DRAWINGS

FIG. 3 is a fragmentary cross-sectional view in elevation taken along the line 3—3 of FIG. 1 and showing the shape of the T-shaped armature;

FIG. 4 is a top plan view of the valve with parts broken away to show the manual actuator; and FIG. 5 is a fragmentary view of a modified form of the invention in which the upper seal is fixed in the armature.

DESCRIPTION OF THE PREFERRED EMBODIMENTS

Figure 1:
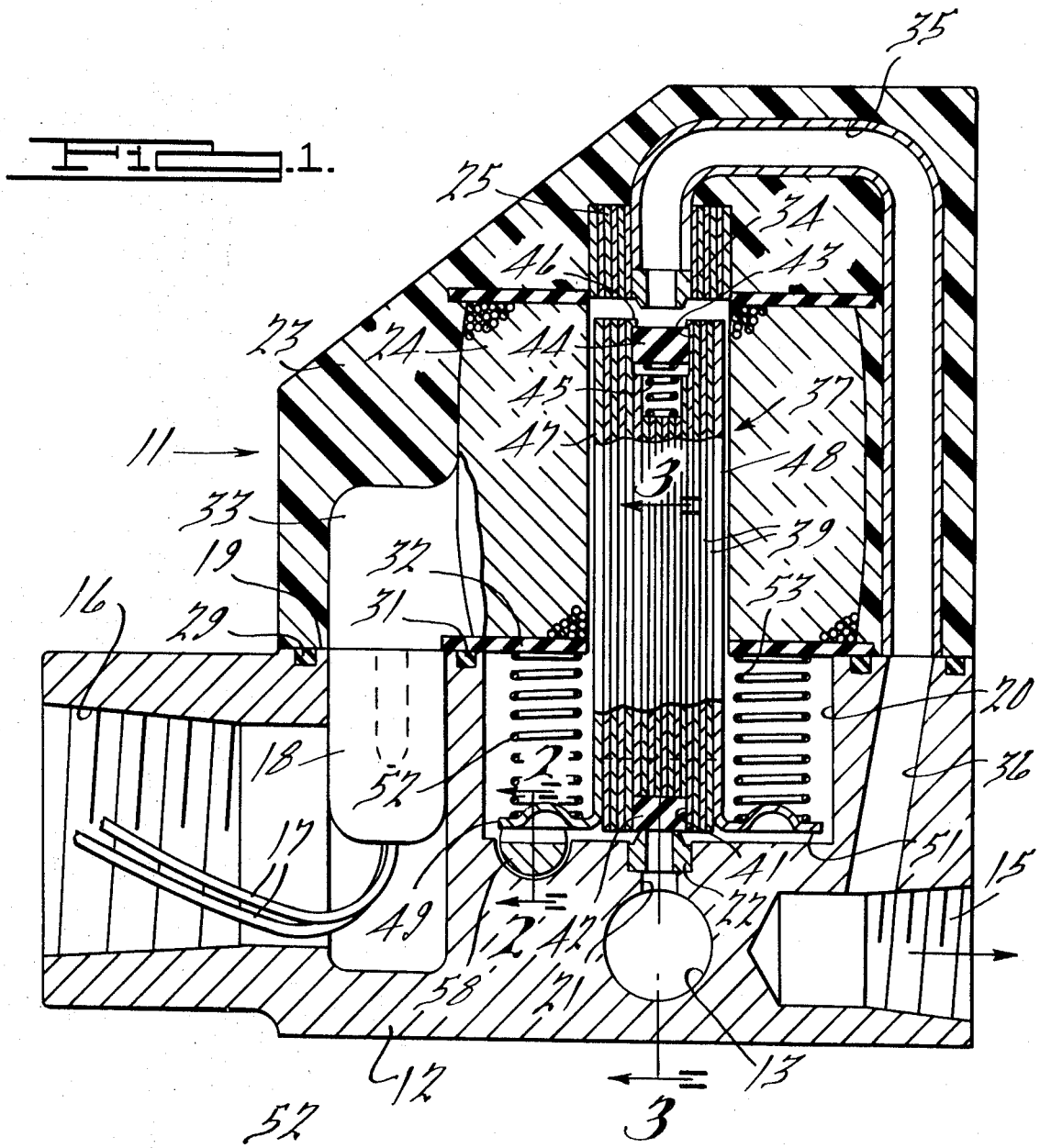
FIG. 1 is a cross-sectional view in elevation showing the solenoid valve construction of this invention incorporated in a three-way normally closed valve.
Figure 2:
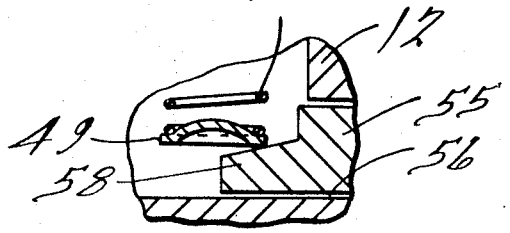
FIG. 2 is a fragmentary cross-sectional view taken along the line 2—2 of FIG. 1 and showing the manner in which the lower ends of the springs are supported.

The valve is generally indicated at 11 and comprises a base 12 in the opposite sides of which are formed an inlet port 13 and working port 14, as shown in FIG. 3. One end of the base is provided with an exhaust port 15 and the opposite end has an opening 16 for electrical conduits 17 leading to a receptacle 18. This receptacle is mounted in base 12 in such a manner as to be flush with the upper surface 19 thereof.

Base 12 has an upwardly open recess 20 therein, and a passage 21 connects the lower end of this recess with inlet port 13. The upper portion of passage 21 is widened to receive a valve seat 22 projecting slightly above the bottom of recess 20.

A casing 23 is secured to upper surface 19 of base 12. This casing may be fabricated of a plastic material, and a coil 24 is embedded therein. This coil is disposed within a C-shaped core 25 carried by casing 23, core 25 extending downwardly into enlarged portion 26 of recess 20 in the base. The casing is secured to base 12 by bolts 27, the base itself being mountable on a support by bolts 28, as seen in FIG. 4. A seal 29 is disposed between the outer portion of casing 23 and base 12, whereas a seal 31 carried by the base is engaged by the lower member 32 of coil 24. Casing 23 also encloses a plug 33 which fits into receptacle 18.

Core 25 is of laminated construction, as seen in FIG. 1, and an exhaust valve seat 34 is mounted in the central portion thereof and is connected by a tube 35 in casing 23 and a passage 36 in base 12 to exhaust port 15. A T-shaped armature generally indicated at 37 has its central portion disposed within coil 24 and its arms extending beneath the lower ends of core 25. The latter act as stops and have shading coils 38 embedded in the facing surfaces thereof.

Armature 37 is constructed of laminations 39. A recess 41 is formed in the lower end of the armature and holds a rubberlike inlet valve seal 42 engageable with valve seat 22. A recess 43 formed in the upper end of armature 37 carries a rubberlike valve seal 44 urged by a spring 45 toward exhaust valve seat 34 but held in position by a lip 46 or other appropriate means. The outer laminations 47 and 48 of armature 37 are somewhat thicker than the main laminations and are bent at the lower ends to form supports 49 and 51 for the lower ends of coil springs 52 and 53 respectively. The upper ends of these helical compression springs are supported by member 32 so that the springs urge armature 37 downwardly, causing inlet valve seal 42 to engage seat 22. The upward force of fluid pressure in seat 22, which is proportional to both the unit pressure and the port area, will be counteracted by springs 52 and 53. The entire armature assembly is held together by a plurality of rivets 54 as seen in FIG. 3.

A manual actuator 55 in the form of a rotary member is mounted in an aperture 56 of base 12 and is rotatable by means of a slot 57 at its exposed end. The inner end 58 of this actuator is flattened as shown in FIG. 1, this flattened end being disposed beneath outwardly bent portion 49 of lamination 47. Rotation of actuator 55 will thus lift armature 37 from its deenergized position to its energized position.

When valve 11 is in its normally closed position, working port 14 will be connected through recess 20 and a space 59 surrounding armature 37 to exhaust valve seat 34, and thence to exhaust port 15. When armature 37 is in its upper or energized position, exhaust valve seal 44 will engage seat 34 and the fluid will flow from inlet valve seat 22 through the lower portion of recess 20 to working port 14 through a passage 61 leading from recess 20 to port 14, as seen in FIG. 3.

In operation, valve 11 will normally be closed with springs 52 and 53 holding inlet valve 42 against seat 22 and working port 14 connected to exhaust port 15.

When coil 24 is energized, armature 37 will be lifted to counteract the spring force. Because of the laminated construction of armature 37, coil 24 will exert a much greater lifting force output per watt of input, thus permitting stronger springs to be used than would otherwise be the case.

FIG. 5 shows a modified form of the the invention in which the spring for the upper valve seal, indicated at 101, is eliminated, the seal being fixed in armature 102 and located so as to close the upper orifice when valve 11 is opened, pressurizing working port 14.

If valve 11 is to be used as a normally open valve, port 15 will be made the inlet port and port 13 the exhaust port. In such case, the armature will be spring-urged toward its open position, and the initial electromagnetic force needed to shift the armature to its closed position will be greater than the force of springs 52 and 53 plus the fluid pressure acting on the area of seat 22. After the armature has shifted, the electromagnetic force needed to hold it in its closed position will be greater than the force of springs 52 and 53 plus the force of spring 45 or, if spring 45 is not present, the air pressure at seat 34.

Alternatively, with port 15 blocked, valve 11 could function as a two-way normally closed valve with its inlet at port 13. With port 13 blocked and port 15 as the inlet, valve 11 could function as a normally open two-way valve.

I claim:

1. In a solenoid valve, a laminated C-shaped core, a T-shaped armature of laminated construction, a coil adjacent said core and surrounding the central portion of said armature, the arms of said armature being disposed outside the ends of said core, springs disposed between one end of said coil and the arm end of said armature and directly urging the arms of said armature away from said core, said springs being laterally spaced from the arms of said armature, said arms thus being engageable directly with the ends of said core when the coil is energized, a first poppet-type valve at one end of said armature, and a second poppet-type valve at the opposite end of said armature.

2. The combination according to claim 1, said second valve comprising a valve seal carried in a recess at said opposite end of the armature and engageable with a seat carried by said core in response to energization of said coil, whereby said springs will be compressed and said first valve opened.

3. The combination according to claim 2, said valve seal comprising a rubberlike member spring-urged toward said valve seat and retained in said recess, whereby the arms of said armature may contact said core when the coil is energized.

5. In a solenoid valve, a laminated C-shaped core, a T-shaped armature of laminated construction, a coil adjacent said core and surrounding the central portion of said armature, the arms of said armature being disposed outside the ends of said core, springs disposed between one end of said coil and the arm end of said armature and urging the arms of said armature away from said core, a first poppet-type valve at one end of said armature, and a second poppet-type valve at the opposite end of said armature, said second valve comprising a valve seal carried in a recess at said opposite end of the armature and engageable with a seat carried by said core in response to energization of said coil, whereby said springs will be compressed and said first valve opened, a base, inlet, working and exhaust ports in said base, a recess in said base within which said T-shaped armature is disposed, said working port being connected to said recess, one of said other ports being connected to a seat for said first valve, a space surrounding said armature and extending to said second valve, whereby fluid will flow between said first valve seat and said working port through said base recess when said coil is energized and will flow between said working port and said second valve seat through said recess and space when the coil is deenergized, and passageway means connecting said second valve seat to its port.

6. The combination according to claim 5, further provided with a casing surrounding said coil and core, said passageway means comprising a tube in said casing connected with a passage in said base.

4. The combination according to claim 1, said armature having a pair of outside laminations carrying outwardly bent ears, said springs comprising two springs engaging said ears.

7. In a solenoid valve, a base having an inlet port, a working port and an exhaust port extending from the sides thereof, an electrical receptacle carried by said base, the base having a flat upper surface with a recess therein, said receptacle being exposed at said upper surface, a casing mounted on said base, said casing having a C-shaped laminated core and a coil, a downwardly facing plug carried by said casing interfitting with said receptacle, said plug being connected to said coil, a T-shaped armature of laminated construction having a central portion within said coil and arms extending beneath the open end of said core, a resilient inlet valve seal mounted in a recess in the lower end of said armature, a poppet-type inlet valve seat in the lower portion of said base recess and connected with said inlet port, a pair of outwardly extending spring supporting tabs on the outer laminations of said armature, a pair of helical coil compression springs disposed between said tabs and the underside of said coil and urging said inlet valve seal against said seat, an exhaust valve seal carried in a recess at the upper end of said armature, an exhaust valve seat carried by the central portion of said C-shaped core, passageway means in said casing and base connecting said exhaust valve seat with said exhaust port, a passage between said working port and said base recess, and a space surrounding said armature and connecting said base recess with said exhaust valve seat, whereby said springs will normally hold said valve in its closed position with said inlet valve closed and said exhaust valve opened, energization of said coil closing said exhaust valve and opening the inlet valve.

8. The combination according to claim 7, further provided with a cylindrical manual actuator rotatably mounted in an aperture of said base and having a flattened portion engageable with one of said tabs in response to rotation of the actuator to thereby lift said armature and move the valve to its open position.